FREQUENCY MODULATION SYSTEM

Filed April 6, 1946 3 Sheets-Sheet 1

INVENTOR.
Robert L. Sproull
BY
C.D. Tuska
ATTORNEY

Jan. 3, 1950 R. L. SPROULL 2,493,091

FREQUENCY MODULATION SYSTEM

Filed April 6, 1946 3 Sheets-Sheet 2

INVENTOR.

Robert L. Sproull

BY

ATTORNEY.

INVENTOR.
Robert L. Sproull
BY
C D Tuska
Attorney

Patented Jan. 3, 1950 2,493,091

UNITED STATES PATENT OFFICE 2,493,091

FREQUENCY MODULATION SYSTEM

Robert L. Sproull, Ithaca, N. Y., assignor to Radio Corporation of America, a corporation of Delaware Application April 6, 1946, Serial No. 660,098

15 Claims. (Cl. 332—24)

Figure 1:
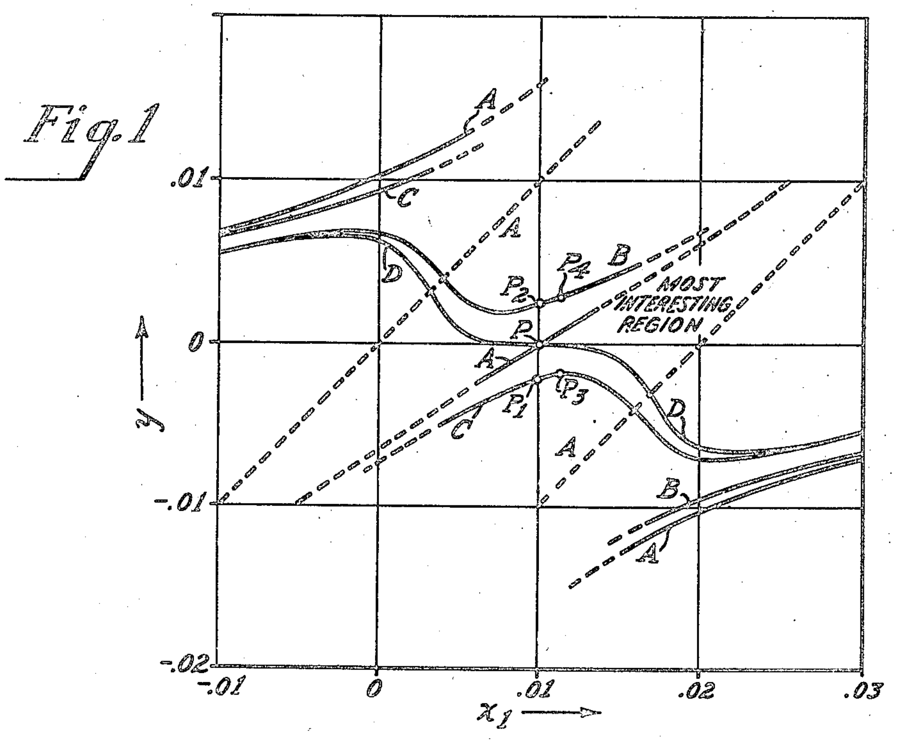

This invention relates generally to radio frequency generators and more particularly to improved methods of and means for employing bi-resonant circuits for modulating the frequency of such generators.

For rapid transmission of intelligence by a frequency modulated microwave signal, means is required for varying rapidly the frequency of the energy generated by the radio frequency oscillator. It is essential that the generated wave energy remain substantially constant in magnitude as the frequency is varied, in order that negligible amplitude modulation will be associated with the desired frequency modulation.

The instant invention is an improvement upon the systems disclosed and claimed in applicant's copending application Serial No. 659,705, filed April 5, 1946. In said copending application, the modulation systems disclosed comprise a variably tuned resonant circuit which is closely coupled to the radio frequency oscillator "tank" circuit and which include a thermionic device such as a thermionic diode to vary the "Q" (ratio of reactance to resistance) of the variably tuned resonant circuit. Due to the inherent characteristics of coupled reactive circuits, the variations in Q produced in the resonant circuit vary the frequency of the oscillations generated by the oscillator. Since the loading (abstraction of oscillatory energy) provided by the diode can be controlled by varying the average potential difference between the electrodes of the diode, the frequency of the generated radio frequency signals may be varied at a rapid rate by means of a varying diode control voltage.

The instant invention contemplates the use of two tuned circuits (or a circuit having two resonant frequencies) both of which are coupled to the oscillator "tank" circuit, in a manner whereby the generated frequency will depend upon the resonant frequencies of the two tuned circuits and the natural frequency of the generator "tank" circuit.

The invention herein will be described by reference to its application to the frequency modulation of microwave signals generated by a conventional magnetron oscillator. It should be understood, however, that the invention may be applied to accomplish frequency modulation of any other known type of microwave or radio frequency generator in accordance with known microwave or radio transmission technique.

A preferred embodiment of the invention comprises a magnetron oscillator of the multicavity type wherein the load is coupled to one of the magnetron resonant cavities by means of a coupling loop projecting into the cavity. Two variably tuned resonant circuits each comprise a coaxial line resonator each having one end thereof terminated in coupling loops extending into different ones of the resonant cavities of the magnetron. However, coaxial line coupling loops may be coupled into the same or different ones of the magnetron resonant cavities. Separate thermionic diodes are serially connected with the inner conductors of each of the coaxial lines at points adjacent to the ends thereof remote from the magnetron.

Initial tuning of the coaxial lines to a frequency or frequencies of the order of the resonant frequency of the magnetron is accomplished by means of tuning screws or plungers extending into each of the coaxial lines. A source of modulation signals applied to each of the diodes provides corresponding variations in opposite sense of the conductance of the diodes, thereby providing variations in "Q" (ratio of reactance to resistance) of each of the coaxial lines. Such variations in the Q of the coaxial lines in response to the modulation signals may provide corresponding variations of the resultant microwave frequency generated by the magnetron and the two associated coaxial lines.

The modulation system described in applicant's copending application identified heretofore provides continuous frequency modulation over a relatively wide frequency band in response to modulation potentials applied to the single diode employed therein. In the instant system the generated microwave frequency may be caused to shift instantaneously from one selected value to a second selected value or, if desired, the frequency shift may be gradually accomplished in synchronism with and as a function of the magnitudes of the applied modulation signals.

An important advantage of the instant system over the simple diode modulator disclosed in applicant's copending application is that less disturbance of the modulation characteristics is encountered if the "tank" circuit resonant frequency "drifts" relative to the resonant frequency of the coupled tuned circuits associated therewith. Such frequency drifts may be caused by temperature, current, or load variations associated with the microwave oscillator. Although the average frequency generated by the system may vary slightly in response to such circuit changes, the frequency shifts responsive to the modulation signals relative to the mean carrier frequency will be substantially unchanged. The improvement in stability has been found to be of at least one order of magnitude. Furthermore, the instant system provides means whereby frequency modulation of the microwave signals may be attained over a frequency band of the order of 50 times the width of that obtainable by directly varying the Q of the magnetron oscillator to a similar extent. By operating the associated microwave magnetron and the variably tuned resonant circuits in the second quadrant of their reactive characteristic, transit-time effects in the thermionic diodes may be utilized to supplement the variations in conductance in the diodes in response to the modulating signals.

Since the diodes normally provide an increasing rate of change of microwave frequency modulation as a function of the modulating voltage, correction circuits may be provided which are responsive to the diode current and which effectively compensate for non-linearity of frequency modulation. Such correction systems are disclosed and claimed in applicant's copending application.

In general the resonant frequencies of the oscillator tank circuit, the resonant frequencies of the coupled tuned circuits and the resultant generated frequency may be approximately expressed as follows, providing the coupling coefficients are small $$y=\frac{k_1^2(y-x_1)}{4(y-x_1)^2+1/Q_1^2}+\frac{k_2^2(y-x_2)}{4(y-x_2)^2+1/Q_2^2} \qquad (1)$$

where $k_1$ is the coupling coefficient between the first of said circuits and said tank circuit, $k_2$ is the coupling coefficient between the second of said coupled circuits and said tank circuit, $Q_1$ is the Q of the first coupled circuit, $Q_2$ is the Q of the second coupled circuit, and $$y=\frac{f-f_0}{f_0} \qquad (2)$$

$$x_1=\frac{f_1-f_0}{f_0}+\frac{k_1^2}{2} \qquad (3)$$

$$x_2=\frac{f_2-f_0}{2}+\frac{k_2^2}{2} \qquad (4)$$

where $f$ is the resultant generated frequency, $f_0$ is the resonant frequency of the generator tank circuit, $f_1$ is the resonant frequency of one of the coupled circuits, $f_2$ is the resonant frequency of the other of said coupled circuits.

Among the objects of the invention are to provide an improved method of and means for frequency modulating a radio frequency generator. Another object is to provide an improved method of and means for frequency modulating a radio frequency generator while minimizing undesirable amplitude modulation of the generated signals. A further object is to provide an improved radio frequency modulation system utilizing a pair of tuned circuits coupled to the wave generator tank circuit wherein each tuned circuit includes a variable conductance device responsive to a source of modulation signals which vary the Q (ratio of reactance to resistance) of the tuned circuits, thereby providing frequency modulation of the resultant radio frequency oscillations. Another object is to provide an improved means for employing a pair of tuned circuits each including an electronic device for modulating the frequency of a microwave generator comprising tuning said circuits to frequencies of the order of that of said generator and varying at said modulation frequency the conductance and reactance of each of said electronic devices. A still further object of the invention is to provide an improved method of and means for employing a pair of tuned circuits each including an electronic device for modulating the frequency of a microwave generator including a resonant tank circuit wherein said resonant circuits and said tank circuit are coupled together and operated in the second quadrant of their resonant characteristics.

Another object of the invention is to provide an improved microwave frequency modulation system employing a microwave generator having a frequency determining cavity resonator, a pair of tuned coaxial lines coupled to said resonator and variable conductance devices connected to each of said lines and responsive to a source of modulation signals. A still further object is to provide an improved microwave frequency modulation system including a microwave generator having a plurality of carrier frequency determining cavity resonators, and a pair of adjustably tuned resonators coupled to said generator resonators and each including variable conductance devices responsive to a source of modulation signals for varying the "Q" of said coupled resonators and thereby providing corresponding variations of the resultant microwave frequency of said generator.

Figure 2:
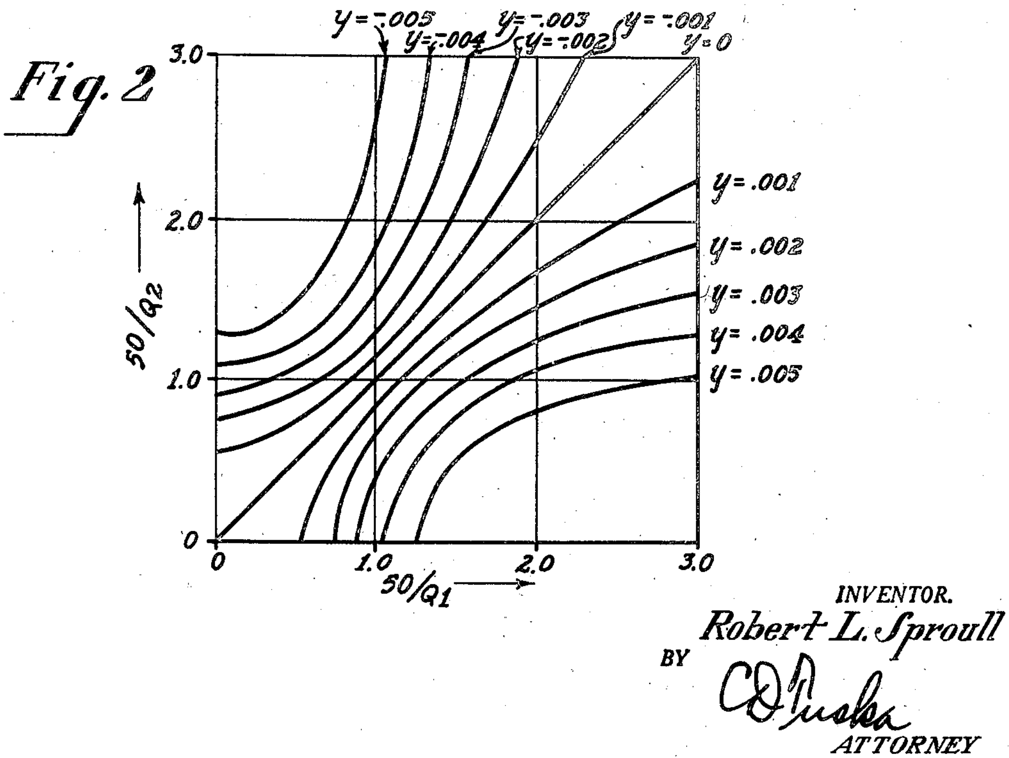
Figure 3:
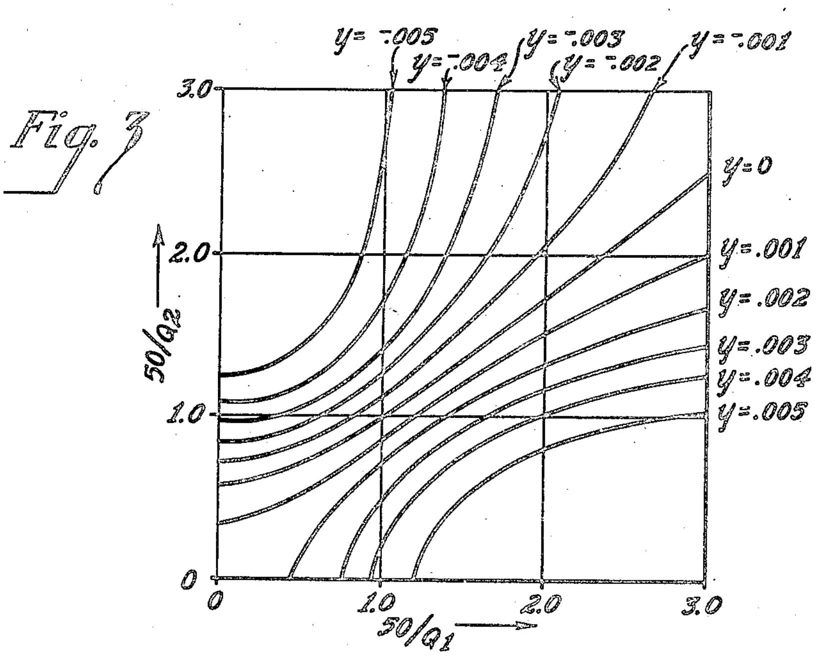
Figure 6:
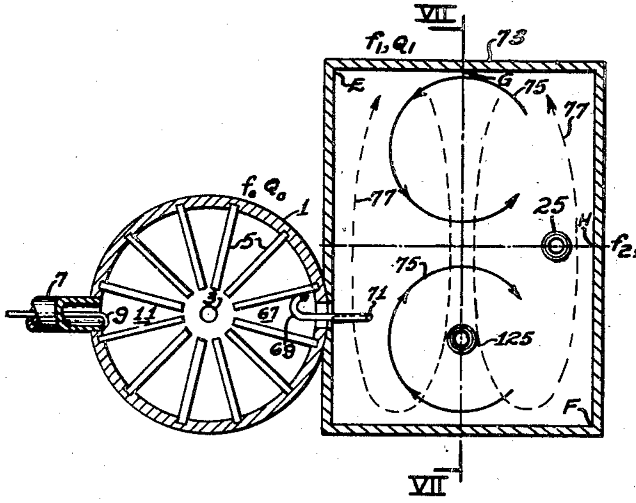
Figure 7:
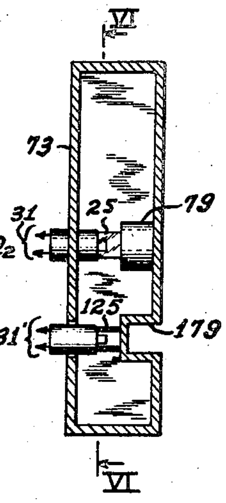
Figures 4, 5:
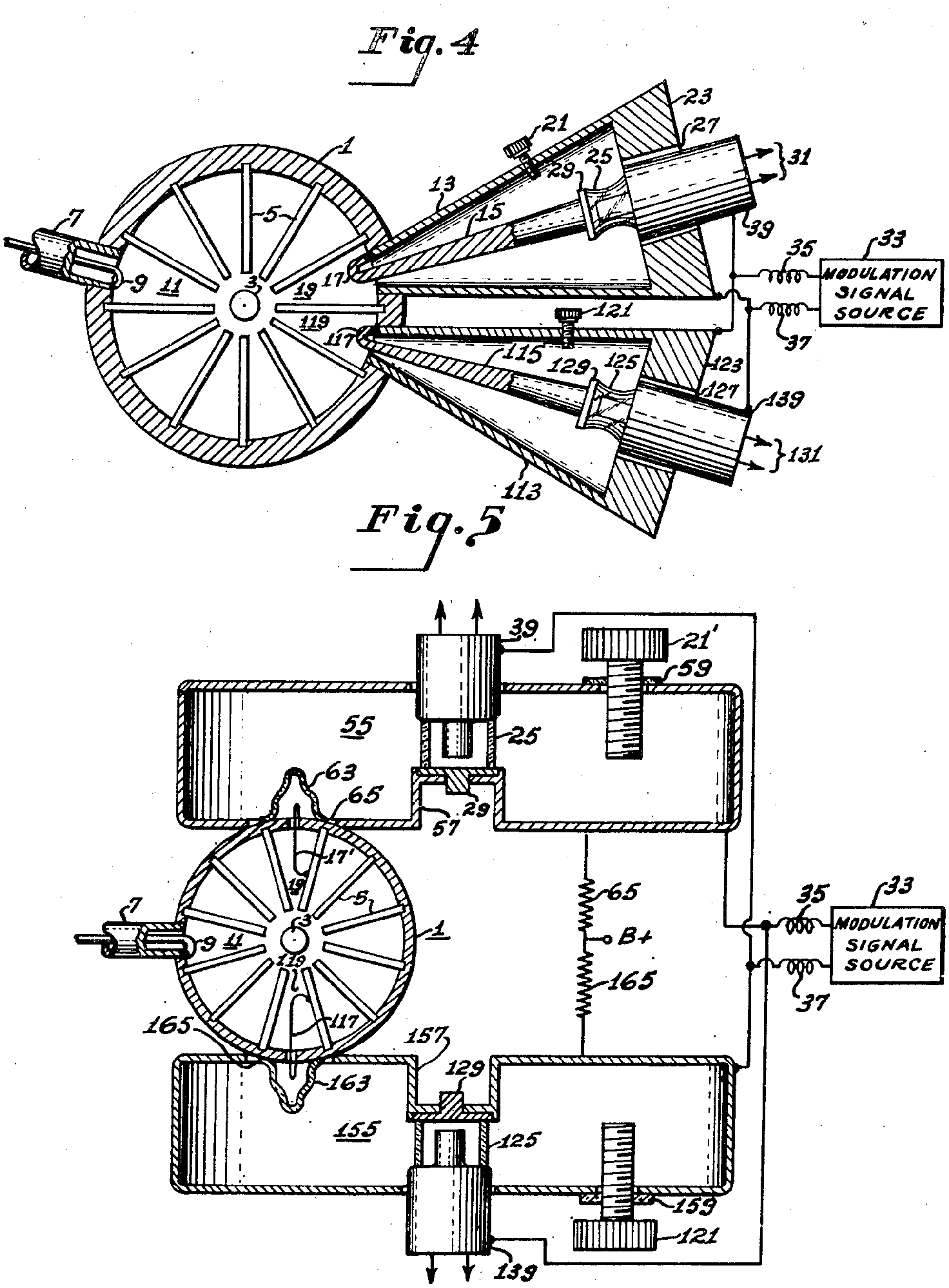

The invention will be described in greater detail by reference to the accompanying drawings of which Figures 1, 2 and 3 are families of graphs illustrative of the operating characteristics of the invention, Figure 4 is a partially schematic, cross-sectional view of a first embodiment of the invention, Figure 5 is a partially schematic cross-sectional view of a second embodiment of the invention, Figure 6 is a cross-sectional plan view taken along the section line VII—VII of a third embodiment of the invention, and Figure 7 is a cross-sectional side view taken along the section line VI—VI of said third embodiment of the invention. Similar reference characters are applied to similar elements throughout the drawings.

Referring to Figure 1, the tuning characteristics of the system are illustrated graphically. If it is assumed that the coupling coefficients $k_1$ and $k_2$ of the two tuned circuits are identical and that $x_1-x_2=.02$, a constant, then the family of graphs of Fig. 1 portray $y$ as a function of $x_1$ when $k^2=5\times10^{-4}$ which is a typical value for efficient coupling to a magnetron oscillator. The graph A represents the limiting conditions when $Q_1$ and $Q_2$ are infinite. The graph B represents conditions when $Q_1=50$ and $Q_2$ is infinite. The graph C represents conditions when $Q_1$ is infinite and $Q_2=50$. The graph D represents conditions when $Q_1$ and $Q_2$ are both equal to 50.

Assuming that $x_1$ is fixed at a value of .01, the condition exists wherein the resonant frequency of one of the coupled circuits is 1 percent less, and the resonant frequency of the other coupled circuit is 1 percent greater than the frequency of the oscillator tank circuit. Then the frequency of oscillations of the complete circuit may be varied from the point $P_2$ through the point P to the point $P_1$ by varying the values of $Q_1$ and $Q_2$ of the coupled circuits between appropriate limits.

The graphs of Figure 2 indicate how the frequency deviation ($f_0y$) varies as $Q_1$ and $Q_2$ are varied with the circuit parameters heretofore assumed. Therefore, if $Q_1$ and $Q_2$ are varied electronically by modulating potentials applied to the diodes so that the Q values vary from 200 to 50, frequent deviations of ± .3 percent may be obtained resulting in a frequency shift of ± 9 mc.

at a mean carrier frequency of 3000 mc. The graphs of Fig. 2 represent the special case where $x_1=.01$ and $x_2=-.01$. The graphs of Figure 3 are similar to those of Fig. 2 with the exception that they represent the special case wherein $x_1=.012$ and $x_2=-.008$.

The diode bias voltages may be controlled as a function of time in any appropriate manner. One simple control condition would be such that $1/Q_2+1/Q_1=$ a constant.

As explained heretofore the circuit of the instant invention provides much greater stability than is obtainable with the single tuned circuit and diode arrangement described in applicant's copending application, since temperature, current, voltage or load changes in the magnetron have much less effect upon the modulation characteristics of the network, notwithstanding the fact that the mean carrier frequency may drift in response to such variations. If it is assumed that the resonant frequency $f_0$ of the tank circuit of the magnetron decreases .2 percent (6 mc. in 3000 mc.) the resultant condition is equivalent to operation between the points $P_3$ and $P_4$ of the graphs of Fig. 1. The average or mean carrier frequency is slightly changed, but the frequency deviations produced by the modulator (relative to the new mean frequency) are practically unchanged. The graphs of Fig. 2 indicate operating characteristics for the initial value of $f_0$ and the graphs of Fig. 3 indicate characteristics for the new value of $f_0$ as functions of $Q_1$ and $Q_2$. The resultant advantage of the instant arrangement over that disclosed in applicant's copending application is that the variations in frequency in response to the modulating signals are made more insensitive to variations in the generator operating characteristics by about an order of magnitude.

A preferred embodiment of the instant invention, shown in Fig. 4, includes a multicavity magnetron oscillator 1 including a centrally located cathode 3 and a plurality of radially extending anode vanes 5 forming a plurality of segmental resonant cavities. A load, not shown, is coupled to the magnetron through a coaxial line 7 which is terminated in a load coupling loop 9 extending into one of the anode cavities 11.

The modulation system includes a pair of tapered coaxial lines having outer conductors 13 and 113 and coaxially disposed inner conductors 15 and 115, respectively, which are terminated in coupling loops 17 and 117 extending into additional ones of the anode cavities 19 and 119. The coaxial lines 13—15 and 113—115 may be tuned in any manner known in the art, such for example, as by means of tuning screws 21 and 121 extending into the spaces between the coaxial conductors. The ends of the coaxial lines 13—15 and 113—115 remote from the magnetron 1 are terminated in apertured annular portions 23 and 123. Separate diode thermionic tubes 25 and 125 extend through apertures 27 and 127 in the annular members 23 and 123, respectively, and are insulated from said members to provide the required direct current isolation. The anode terminals 29 and 129 of the diodes 25 and 125 are inserted in suitable apertures in the ends of the inner coaxial line conductors 15 and 115 whereby the diodes are effectively serially connected in circuit with the coaxial lines. The cathodes of the diodes may be directly or indirectly heated by means of suitable potentials applied to the cathode terminals 31 and 131.

A source of modulation signals 33 is connected through suitable microwave chokes 35 and 37 to the cathode terminals 39 and 139 of the diodes and to the outer conductors 13 and 113 of the coaxial lines. The modulation signal source is connected in opposite polarity to the two diodes. Instead of the coupling loops 9, 17 and 117, the load and modulation circuits respectively, may be coupled into the magnetron cavities through slots or holes suitably proportioned to provide the desired coupling coefficient in accordance with known microwave technique. Other types of tuned microwave circuits may be substituted for the coaxial lines as will be described in greater detail hereinafter. Also if desired, the load may be coupled directly to the modulation cavity resonators or into the same magnetron resonator to which the modulation circuits are coupled.

The dashed lines of the graphs of Fig. 1 represent points satisfying the operating equations which do not represent situations which are physically realizable. In some instances several different frequencies of oscillation all will yield solutions of the equations. At which of these frequencies the actual system will oscillate depends upon the magnitude of the effective resistance of the resonant networks presented to the electron beam in the magnetron. It may be shown that for fixed values of Q this effective resistance is always higher in the portions of the graphs adjacent to the regions where $y$ approaches zero. The higher the input resistance presented by the resonant network to the electron beam, the greater will be the oscillating voltage in response to electron excitation. Hence the beam tends to "lock-in" at the frequency which corresponds to the highest effective shunt resistance and minimum reactance. Thus, only the solid line portions of the graph of Fig. 1 indicate the actual physical relation between the circuit parameters.

The modulator diode may comprise a conventional "lighthouse" type tube, or one of the recently developed coaxial type diodes may be employed. Either directly heated or indirectly heated cathodes may be used. At very high frequencies, the fact that electrons do not traverse the space between the diode cathode and anode electrodes instantaneously produces a reactive effect on the circuit. For tubes having moderately long transit angles (45° to 180°, for example) this effect is generally a negative susceptance. If the diode is placed at a point of intense electric field in the tuned circuit or line, this susceptance will decrease the resonant frequency of the circuit. The effect of such a decrease upon the actual frequency of oscillations of the combined magnetron and modulation tuned circuits is generally much smaller than the effect of the variations in Q produced by the diodes in response to the modulation signals. However, it may be desirable to proportion the circuit in a manner whereby the susceptance effect adds to, rather than subtracts from, the Q effect. This may be accomplished by operating the circuits in the second quadrant of their resonant characteristics.

If desired a diode containing an inert gas at low pressure may be employed in order to lower the Q of the circuit. Furthermore, the surface of the anode electrode of the diode may be covered with a secondary-electron-emissive coating having a secondary emission ratio appreciably greater than zero. A satisfactory coating of this type may comprise silver-oxygen-magnesium which provides an extremely high number of secondary electrons per primary electron. Such a special diode is disclosed in applicant's co-pending application identified heretofore, and permits greater "loading" and lowering of the Q value of the tuned coaxial lines for a predetermined diode cathode area. An additional advantage is that the net low frequency current through the diodes is minimized for a predetermined reduction in Q. Such operation permits controlling the average bias of the diode, and hence the frequency of oscillations, by an electronic modulation signal source having high internal impedance.

To secure these advantages the average transit times of electrons traveling from cathode to anode in the diodes must be appreciable, for example greater than .1 cycle of the high frequency oscillations. Preferably, the anode-cathode spacing, the high frequency field strength, and the diode bias voltages should be so related that the largest possible number of electrons arrive at the anode when the net electric field is so directed that any secondary electrons emitted by the anode are projected toward the cathode. Even if the secondary electrons do not reach the cathode but are returned at a later time to the anode, they remove energy from the high frequency field. From the incomplete and limited present understanding of high-signal-magnitude, long transit-time, space-charge theory for diodes, it is believed that a cathode-anode spacing of .005 inch would provide approximately optimum characteristics for an operating frequency of 4000 mc.

An advantage of increased "driver" circuit internal impedance accrues from the fact that any electrons which are emitted from the anode and which strike the cathode will effectively reduce the net electron current emitted by the cathode. Thus, the load resistance across the driver circuit may be increased as compared with that permissible when employing a conventional modulator diode. "Lighthouse" or coaxial type triodes may be substituted for the diodes in the modulator circuits in order to provide greater gain and flexibility in circuit operation.

Referring to Figure 5 the tuned lines coupled to the anode cavities of the magnetron 1 may comprise separate cavity resonators 55 and 155 each having reentrant portions 57 and 157, respectively, for the diodes 25 and 125. The diode anodes 29 and 129 are directly connected to the reentrant portions 57 and 157, respectively, and the cathodes 39 and 139 thereof are insulated from the cavity resonators. The cavity resonators 55 and 155 may be tuned to frequencies of the order of that of the desired microwave carrier frequency by tuning screws 21' and 121' which, if desired, may be insulated from the cavity walls by insulating bushings 59 and 159, respectively. The positive terminal of the anode voltage supply, not shown, for the diodes is connected through anode resistors 65 and 165 to the cavity resonators 55 and 155, respectively.

The cavity resonator 55 is coupled into the anode resonator 19 of the magnetron 1 by means of the coupling loop 17' which extends into an evacuated projecting portion 63 of the magnetron. Similarly, the cavity resonator 155 is coupled into the anode resonator 119 by means of a second coupling loop 117' which extends into a second evacuated projecting portion 163 of the magnetron. The projecting portions 63 and 163 of the magnetron extend into the interior of the resonators 55 and 155 through apertures 65 and 165, respectively. The operation of the cavity resonator embodiment of the invention is similar in most respects to that of the coaxial line embodiment described heretofore by reference to Figure 5, since the diodes are coupled to the cavity resonators at points of maximum field distribution, whereby variations in diode conductance and susceptance in response to the modulating potentials applied to the diodes effect changes in the Q of the cavity resonators and hence in the generated microwave frequency.

As described heretofore, either diodes or triodes may be employed for varying the Q of the cavity resonators in the same manner as described for controlling the coaxial lines of the first embodiment of the invention. The relative positions of the diodes, the magnetron coupling elements, and the tuning screws may be determined by mathematical circuit analysis in accordance with known microwave technique to provide the desired degree of modulation control in response to modulating potentials applied to the diodes. As with the coaxial line embodiment of the system, the modulation signals may be applied in the same or in opposite polarity to the separate diodes controlling the Q of the separate cavity resonators. If desired, for experimental purposes or for more flexible control, the positioning of the coupling elements, diodes and tuning screws may be made adjustable.

Figures 6 and 7 show a second cavity resonator embodiment of the invention including a magnetron 1 having a thermionic cathode 3 and radially extending anode vanes 5 forming a plurality of anode cavity resonators. A load, not shown, is coupled through a coaxial line 7 terminated in a coupling loop 9 within one of the cavity resonators 11. A second of the anode cavity resonators 67 includes a coupling loop 69 terminating in a second coupling loop 71 within a bi-resonant cavity resonator 73 which can resonate in either or both of the modes indicated by the solid line and dash line arrows 75 and 77 indicating the magnetic fields in the cavity. The coupling provided by the coupling element 71 is equally effective with respect to both resonant modes. The diode 25 is coupled into the cavity resonator transversely thereof at a reentrant portion 79 on one of the principal axes of the resonator, whereby control potentials applied to the diode control the Q of the resonator for both of its resonant modes.

If desired, separate diode modulators 25 and 125 may be employed at the points 79 and 179 on both of the principal axes of the resonator instead of on only one axis. The diodes should be biased in opposite polarity by the modulation signals as in the devices described heretofore by reference to Figs. 4 and 5. Furthermore, if desired, a single electron beam device may be employed at either of the points E or G to project an electron beam diagonally through the cavity resonator on the axes EF or GH.

The operation of the bi-resonant resonator embodiment of the invention is essentially similar to that described heretofore with respect to that of the double resonator embodiment described by reference to Fig. 5 of the drawing.

The invention has been described herein by particular reference to its application to microwave frequency modulation systems and techniques. However, the improved modulation system disclosed also has important applications for low power, relatively low radio frequency systems wherein frequency modulation of the carrier frequency is desired. For example, a simple frequency modulation circuit employing the invention might well include a conventional "Hartley" or "tuned grid-tuned plate" oscillator circuit having a reactive circuit coupled to the oscillator tank circuit wherein said reactive circuit or winding includes the diode modulator tube. For example, the reactive circuit may include an inductive winding serially connected with a tuning capacitor and the modulator diode, whereby the capacitor may be adjusted to provide near-resonance as described heretofore. The average diode bias voltage might be provided in any desired manner, and the diode modulation voltage might be provided by a conventional microphone-audio amplifier combination. The resultant improved circuit provides a simple frequency modulation transmitter having several advantages over a conventional "reactance tube" circuit, since greater stability and wider band frequency modulation is provided.

Thus, the invention described herein comprises several embodiments of improved frequency modulator circuits wherein a magnetron microwave generator may be frequency modulated by variation of the Q of a pair of microwave resonant circuits comprising coaxial lines or cavity resonators, wherein the Q of said resonant circuits is controlled by one or more thermionic tubes responsive to a source of modulation signals. The improved system disclosed herein provides greater stability of operation and greater independence of magnetron operating parameters than is obtainable with previously known systems.

I claim as my invention:

1. The method of employing a bi-resonant circuit including a pair of electronic devices for modulating the frequency of a radio frequency generator comprising coupling said circuit to said generator, tuning said circuit normally to frequencies respectively slightly higher than and slightly lower than that of said generator, and varying at said modulation frequency and in opposite sense the conductance of said devices to vary the Q of said circuit and the frequency of said generator.

2. The method of employing a pair of tuned circuits each including an electronic device for modulating the carrier frequency of a radio frequency generator in response to modulation signals comprising separately coupling said circuits to said generator, tuning said circuits normally to frequencies respectively slightly higher than and slightly lower than the frequency of said generator, applying said signals to said devices, and varying in opposite sense at said modulation frequency in response to said signals the conductance of said devices to vary in opposite sense the Q's of said circuits and the carrier frequency of said generator.

3. A frequency modulation system including a radio frequency generator having a frequency determining first tuned circuit, a pair of additional tuned circuits coupled into said first tuned circuit, said additional tuned circuits each including a variable conductance device, and means for varying in opposite sense the conductances of said devices as a function of the desired modulation of said generator, said variations of the conductances of said devices providing corresponding variations of the Q's of said additional tuned circuits and of the output frequency of said generator.

4. A frequency modulation system including a microwave generator having a carrier frequency determining cavity resonator, a pair of tuned circuits coupled into said resonator, said tuned circuits each including a variable conductance device, means for tuning said circuits respectively to frequencies slightly higher than and slightly lower than the frequency of said generator, a source of modulation signals, and means for applying said signals to said devices for varying in opposite sense the conductances of said devices, said variations of the conductances of said devices providing corresponding variations of the Q's of said circuits and of the carrier microwave frequency of said generator.

5. A frequency modulation system including a microwave generator having a carrier frequency determining cavity resonator, a pair of tuned coaxial lines coupled into said resonator, a pair of variable conductance devices each connected to one of said lines, a source of modulation signals, and means for applying said signals to said devices for varying in opposite sense the conductances of said devices, said variations of the conductances of said devices providing corresponding variations of the Q's of said lines and of the carrier microwave frequency of said generator.

6. A frequency modulation system including a microwave generator having a frequency determining cavity resonator, a pair of tuned lines each coupled into said resonator, a pair of thermionic tubes each connected to one of said lines, a source of modulation signals, and means for applying said signals to said tubes to vary in opposite sense the conductances thereof, said variations of the conductances of said tubes providing corresponding variations of the Q's of said line and of the microwave frequency of said generator.

7. A frequency modulation system including a microwave generator having a frequency determining cavity resonator, a pair of tuned lines each coupled into said resonator, a pair of thermionic tubes each serially connected with one of said lines, a source of modulation signals, and means for applying said signals to said tubes to vary in opposite sense the conductances thereof, said variations of the conductances of said tubes providing corresponding variations of the Q's of said line and of the microwave frequency of said generator.

8. A frequency modulation system including a microwave generator having a carrier frequency determining cavity resonator, second and third tunable cavity resonators, means providing microwave coupling between said generator resonator and said second and third resonators, a thermionic tube coupled into said second resonator for varying the tuning thereof, a second thermionic tube coupled into said third resonator for varying the tuning thereof, a source of modulation signals, and means for applying said signals to said tubes to vary in opposite sense the conductances of said tubes, said variations of the conductances of said tubes providing corresponding variations of the Q's of said second and said third resonators and of the carrier microwave frequency of said generator.

9. A system according to claim 8 including a load coupled into said first mentioned cavity resonator.

10. A system according to claim 8 wherein said second and said third resonators each include a reentrant portion having said tubes respectively coupled thereto at said reentrant portion.

11. The method according to claim 2 employing a pair of thermionic tubes each coupled to one of said tuned circuits, including combining the reactive and conductive characteristics of said tubes in opposite sense to excite said tuned circuits and said generator in the second quadrant of their combined resonant characteristics.

12. A frequency modulation system including a microwave generator having a carrier frequency determining cavity resonator, a second bi-resonant tunable cavity resonator having two resonant modes, means providing microwave coupling between said resonators, a thermionic tube coupled into said second resonator for varying the tuning thereof, a source of modulation signals, means for applying said signals to said tube to vary its conductance, said variations of the conductance of said tube providing corresponding variations of the Q and of the mode of excitation of said bi-resonant resonator and hence of the carrier microwave frequency of said generator, and a load coupled into said first-mentioned resonator.

13. A frequency modulation system including a microwave generator having a plurality of carrier frequency determining cavity resonators, a bi-resonant tunable cavity resonator having two resonant modes, means providing microwave coupling between said generator and tunable resonators, a thermionic tube coupled into said tunable resonator for varying the tuning thereof, a source of modulation signals, means for applying said signals to said tube to vary its conductance, said variations of the conductance of said tube providing corresponding variations of the Q and of the mode of excitation of said bi-resonant resonator and hence of the carrier microwave frequency of said generator, and a load coupled into one of said first mentioned resonators.

14. A frequency modulation system including a microwave generator having a plurality of carrier frequency determining cavity resonators, a pair of tunable cavity resonators, means providing microwave coupling between said tunable and generator resonators, separate thermionic tubes coupled into each of said tunable resonators for varying the tuning thereof, a source of modulation signals, means for applying said signals to said tubes to vary in opposite sense the conductances thereof, said variations of the conductances of said tubes providing corresponding variations of the Q's of said tunable resonators and hence of the carrier microwave frequency of said generator, and a load coupled into one of said first-mentioned resonators.

15. A frequency modulation system including a microwave generator having a carrier frequency determining cavity resonator, a second bi-resonant tunable cavity resonator having two resonant modes, means providing microwave coupling between said resonators, a pair of thermionic tubes coupled into said second resonator for varying the tuning of different modes thereof, a source of modulation signals, means for applying said signals to said tubes to vary in opposite sense the conductances thereof, said variations of the conductances of said tubes providing corresponding variations of the Q and of the mode of excitation of said bi-resonant resonator and hence of the carrier microwave frequency of said generator, and a load coupled into said first mentioned resonator.

ROBERT L. SPROULL.

REFERENCES CITED

The following references are of record in the file of this patent:

UNITED STATES PATENTS

| Number | Name | Date |
|---|---|---|
| 2,374,810 | Fremlin | May 1, 1945 |
| 2,411,151 | Fisk | Nov. 19, 1946 |
| 2,421,725 | Stewart | June 3, 1947 |